(12) United States Patent
Miranda et al.

(10) Patent No.: US 11,616,565 B2
(45) Date of Patent: Mar. 28, 2023

(54) BEAM POINTING FINE TUNING FOR VEHICLE-BASED ANTENNAS

(71) Applicant: GOGO BUSINESS AVIATION LLC, Broomfield, CO (US)

(72) Inventors: Heinz A. Miranda, Cary, IL (US); Michael H. Baker, Elmhurst, IL (US); Matthew J. Dufner, Elmhurst, IL (US); Yong Liu, Chicago, IL (US); James P. Michels, Lake Zurich, IL (US); Francis Forest, Peachtree Corners, GA (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 0 days.

(21) Appl. No.: 17/364,165

(22) Filed: Jun. 30, 2021

(65) Prior Publication Data
US 2023/0006730 A1 Jan. 5, 2023

(51) Int. Cl.
*H04B 7/185* (2006.01)
*H04W 36/00* (2009.01)
(Continued)

(52) U.S. Cl.
CPC .......... *H04B 7/18506* (2013.01); *H01Q 1/28* (2013.01); *H04B 7/0617* (2013.01);
(Continued)

(58) Field of Classification Search
CPC .......... H01Q 1/28; H01Q 3/30; H01Q 1/1257; H01Q 1/286; H04B 7/0617; H04B 7/04; H04B 7/18506; H04W 72/046
See application file for complete search history.

(56) References Cited

U.S. PATENT DOCUMENTS 6,163,533 A   12/2000   Esmailzadeh et al.
6,417,803 B1   7/2002   de La Chapelle et al.
(Continued)

FOREIGN PATENT DOCUMENTS

CN   1653785 A   8/2005
CN   105409298 A   3/2016
(Continued)

OTHER PUBLICATIONS

International Application No. PCT/US2019/026864, International Search Report and Written Opinion, dated Jun. 26, 2019.
(Continued)

*Primary Examiner* — Nam T Huynh
(74) *Attorney, Agent, or Firm* — Marshall, Gerstein & Borun LLP; Randall G. Rueth (57) ABSTRACT

A first beam is implemented, from a set of vehicle-based antennas, for current or future communication with a ground-based or satellite-based network via an external antenna (e.g., of a base station or satellite). A second beam may be implemented to detect or determine a better pointing angle for the first beam, thereby "fine tuning" the pointing angle for the first beam. Specifically, the second beam may be "swept" through a range of pointing angles while a signal parameter representing signal quality or strength is measured, detected, or calculated at each pointing angle. The values for the signal parameter may be evaluated to identify a desired value and the pointing angle at which the desired value was obtained. The first beam may be reoriented or repointed at the desired pointing angle, and one or more nodes of vehicle-based communication system may communicate with an external network via the first beam.

21 Claims, 4 Drawing Sheets

(51) Int. Cl.
*H04W 16/28* (2009.01)
*H01Q 1/28* (2006.01)
*H04B 7/06* (2006.01)
*H01Q 1/12* (2006.01)

(52) U.S. Cl.
CPC ....... *H04W 16/28* (2013.01); *H04W 36/0072* (2013.01); *H04W 36/0094* (2013.01); *H01Q 1/1257* (2013.01)

(56) References Cited

U.S. PATENT DOCUMENTS

| | | |
|---|---|---|
| 7,091,906 B2 | 8/2006 | Chevalier et al. |
| 7,227,907 B2 | 6/2007 | Proctor, Jr. et al. |
| 7,304,605 B2 | 12/2007 | Wells |
| 7,813,700 B2 | 10/2010 | Zheng et al. |
| 7,986,918 B2 | 7/2011 | Kontola et al. |
| 8,848,605 B2 | 9/2014 | Ohm et al. |
| 8,849,288 B2 | 9/2014 | Vilhar |
| 8,914,022 B2 | 12/2014 | Kostanic et al. |
| 9,319,172 B2 | 4/2016 | Jalali et al. |
| 9,681,393 B2 | 6/2017 | Mohlmann et al. |
| 9,712,275 B2 | 7/2017 | Johnson et al. |
| 10,117,113 B2 | 10/2018 | Braun et al. |
| 10,425,148 B2 | 9/2019 | Jalali |
| 10,439,707 B1 | 10/2019 | Dana et al. |
| 10,447,380 B1 | 10/2019 | Lu et al. |
| 10,608,760 B2 | 3/2020 | Cordone |
| 10,644,784 B2 | 5/2020 | Jalali |
| 10,841,959 B2 | 11/2020 | Islam et al. |
| 10,938,492 B2 | 3/2021 | Cordone |
| 11,076,372 B1 | 7/2021 | Miranda et al. |
| 11,374,668 B2 | 6/2022 | Cordone |
| 2010/0315288 A1 | 12/2010 | Liu et al. |
| 2012/0026952 A1 | 2/2012 | Okubo et al. |
| 2012/0250659 A1 | 10/2012 | Sambhwani |
| 2014/0064110 A1 | 3/2014 | Viorel et al. |
| 2015/0085761 A1 | 3/2015 | Maltsev et al. |
| 2016/0099769 A1 | 4/2016 | Moffatt et al. |
| 2016/0323757 A1 | 11/2016 | Braun et al. |
| 2017/0048826 A1 | 2/2017 | Kishiyama |
| 2017/0155442 A1 | 6/2017 | Hommel et al. |
| 2017/0212243 A1 | 7/2017 | Darapu et al. |
| 2017/0223749 A1* | 8/2017 | Sheldon ............... H04B 7/0617 |
| 2017/0251381 A1 | 8/2017 | Buer et al. |
| 2018/0014261 A1 | 1/2018 | Miranda et al. |
| 2018/0176869 A1 | 6/2018 | Aryafar et al. |
| 2018/0220466 A1 | 8/2018 | Park et al. |
| 2018/0317159 A1 | 11/2018 | Frenger et al. |
| 2018/0337721 A1 | 11/2018 | Miranda et al. |
| 2019/0013566 A1* | 1/2019 | Merrell ............... H01Q 1/1257 |
| 2019/0053286 A1 | 2/2019 | Cho et al. |
| 2019/0132880 A1 | 5/2019 | Byun et al. |
| 2019/0253116 A1 | 8/2019 | Priyanto et al. |
| 2019/0313391 A1 | 10/2019 | Lin |
| 2020/0107372 A1 | 4/2020 | Agiwal et al. |
| 2020/0252977 A1 | 8/2020 | Zhang et al. |
| 2020/0267770 A1 | 8/2020 | Islam et al. |
| 2020/0314595 A1 | 10/2020 | Hayes et al. |
| 2020/0383103 A1 | 12/2020 | Zhou et al. |

FOREIGN PATENT DOCUMENTS

| | | |
|---|---|---|
| CN | 107749883 A | 3/2018 |
| EP | 3249825 A1 | 11/2017 |
| WO | WO-2005122328 A2 | 12/2005 |
| WO | WO-2017151790 A1 | 9/2017 |

OTHER PUBLICATIONS

International Search Report and Written Opinion for Application No. PCT/US2020/066292, dated Mar. 22, 2021.

Anonymous, "5G NR Cell Search and Synchronization—Techplayon", Retrieved from the Internet at: <URL:http://www.techplayon.com/5g-nr-cell-search-and-synchronization-acguiring-systeminformation/> on Mar. 12, 2021.

"What is 5G beamforming, beam stearing and beam switching with massive MIMO," Metaswitch. Retrieved from the Internet: <https://www.metaswitch.com/knowledge-center/reference/what-is-beamforming-beam-steering-and-beam-switching-with-massive-mimo> on Apr. 7, 2021.

"Gogo's Onboard Technology Enabling Inflight Connectivity," Concourse. Retrieved from the Internet at: <http://concourse.gogoair.com/onboard-technology-makes-inflight-connectivity-possible/> on Apr. 7, 2021.

International Application No. PCT/US2019/026864, International Preliminary Reporton Patentability, dated Jun. 26, 2020.

International Application No. PCT/US2019/026864, Written Opinion of the International Preliminary Examining Authority, dated Mar. 10, 2020.

International Application No. PCT/US2020/066292, International Preliminary Report on Patentability, dated May 17, 2022.

* cited by examiner

BEAM POINTING FINE TUNING FOR VEHICLE-BASED ANTENNAS

TECHNICAL FIELD

The present disclosure generally relates to controlling vehicle-based antennas and, more particularly, to doing so in a manner that improves beam pointing and thereby improves communication via the vehicle-based antennas.

BACKGROUND

A vehicle travelling over land, on sea, or through the air often engages in bidirectional communication within a communication network, which may include a satellite or a ground-to-air sub-network, to transmit and receive travel information, media content, or other data. For example, an aircraft may transmit and/or receive a communication signal via an antenna assembly mounted to the aircraft. This communication signal may be transmitted by way of a directional beam projected from the vehicle antenna toward an external antenna for a ground-based or satellite-based network with which the vehicle is attempting to communicate. Because the vehicle may be moving, and because it may be difficult to precisely and accurately estimate the vehicle's position relative to the external antenna of interest, these vehicle-based communication systems often rely on a beam that is projected in a less than optimal direction.

SUMMARY

The described techniques and systems form or implement a first beam, from a set of vehicle-based antennas, for current or future communication with an external antenna of interest (e.g., an antenna of a ground-based base station or of a satellite). A second beam may be implemented to detect or determine a better pointing angle for the first beam, thereby "fine tuning" the pointing angle for first beam. Specifically, the second beam may be "swept" through a range of pointing angles while a signal parameter (representing signal quality or strength) is measured, detected, or calculated at each pointing angle. The values for the signal parameter may be evaluated to identify a desired value and the pointing angle at which the desired value was obtained. The first beam may be reoriented or repointed at the desired pointing angle. Advantageously, by using a second beam to discover an improved pointing angle, the first beam can remain in service. Additionally, the disclosed techniques make the selection of the original pointing angle for the first beam less important. That is, because the pointing angle is going to be fine-tuned, it is sufficient to get the original pointing angle roughly right. As a result, the disclosed techniques lessen the need for highly precise and highly accurate data regarding the position of the vehicle (this information can sometimes be imprecise, even if only slightly). This lessened need for highly precise and accurate data can be especially relevant for older aircraft having old avionics and, more specifically, for old aircraft or vehicles relying on old navigation systems. Said another way, the described techniques enable even old vehicles with old navigation systems to determine desirable pointing angles without having to upgrade to newer and more expensive equipment that might provide improved precision and accuracy when estimating a position of the vehicle.

Advantageously, the improved pointing angles provided by the disclosed techniques result in radio frequency (RF) optimization. In some instances, the disclosed techniques can be used to identify an improved pointing angle that may result in a beam having as much as a 3.5 dB stronger signal (e.g., factor of 2× vs non-optimized angle). Further, the disclosed techniques can significantly improve link budgets. Moreover, RF optimization resulting from the disclosed techniques enables higher throughput on each beam, reduces interference with other beams, and results in higher aggregate throughput. Higher throughput translates to higher capacity, resulting in more capable and desirable communication systems.

In an embodiment, a vehicle communication system comprises one or more antennas disposed on a vehicle. The antennas may be configured to implement a plurality of beams. The plurality of beams includes a first beam configured to be oriented at a given pointing angle to establish a link with one or more external antennas (e.g., at a satellite or at a ground-based base station) that are external to and not disposed on the vehicle. The one or more antennas may be configured to transmit or receive, via the first beam, data between one or more internal nodes disposed on the vehicle (e.g., passenger devices, avionics nodes, etc.) and the one or more external antennas external to the vehicle. The plurality of beams also includes a second beam that may be used to discover an improved pointing angle for the first beam.

Specifically, the system may include a controller configured to be communicatively coupled to the one or more antennas disposed on the vehicle. The controller may be configured to adjust the second beam during a period of time to be oriented at a plurality of pointing angles. The controller may detect a plurality of sets of signal data for a signal from a particular external antenna, wherein each set of signal data is detected at a different one of the plurality of pointing angles. The controller may obtain a plurality of values for a signal parameter for the signal, wherein each value is obtained from a different one of the plurality of sets of signal data and corresponds to a different one of the plurality of pointing angles. The controller may analyze the plurality of values for the signal parameter to identify (a) a desired value for the signal parameter and (b) a particular pointing angle at which the desired value for the signal parameter was obtained. The controller may reorient the first beam from the given pointing angle to the particular pointing angle corresponding to the desired value for the signal parameter. After reorientation, the controller may transmit or receive data, via the first beam while it is oriented at the particular pointing angle, between the particular external antenna and at least one of the one or more internal nodes.

Note, this summary has been provided to introduce a selection of concepts further described below in the detailed description. As explained in the detailed description, certain embodiments may include features and advantages not described in this summary. Further, certain embodiments may omit one or more features or advantages described in this summary.

DETAILED DESCRIPTION

Figure 1:
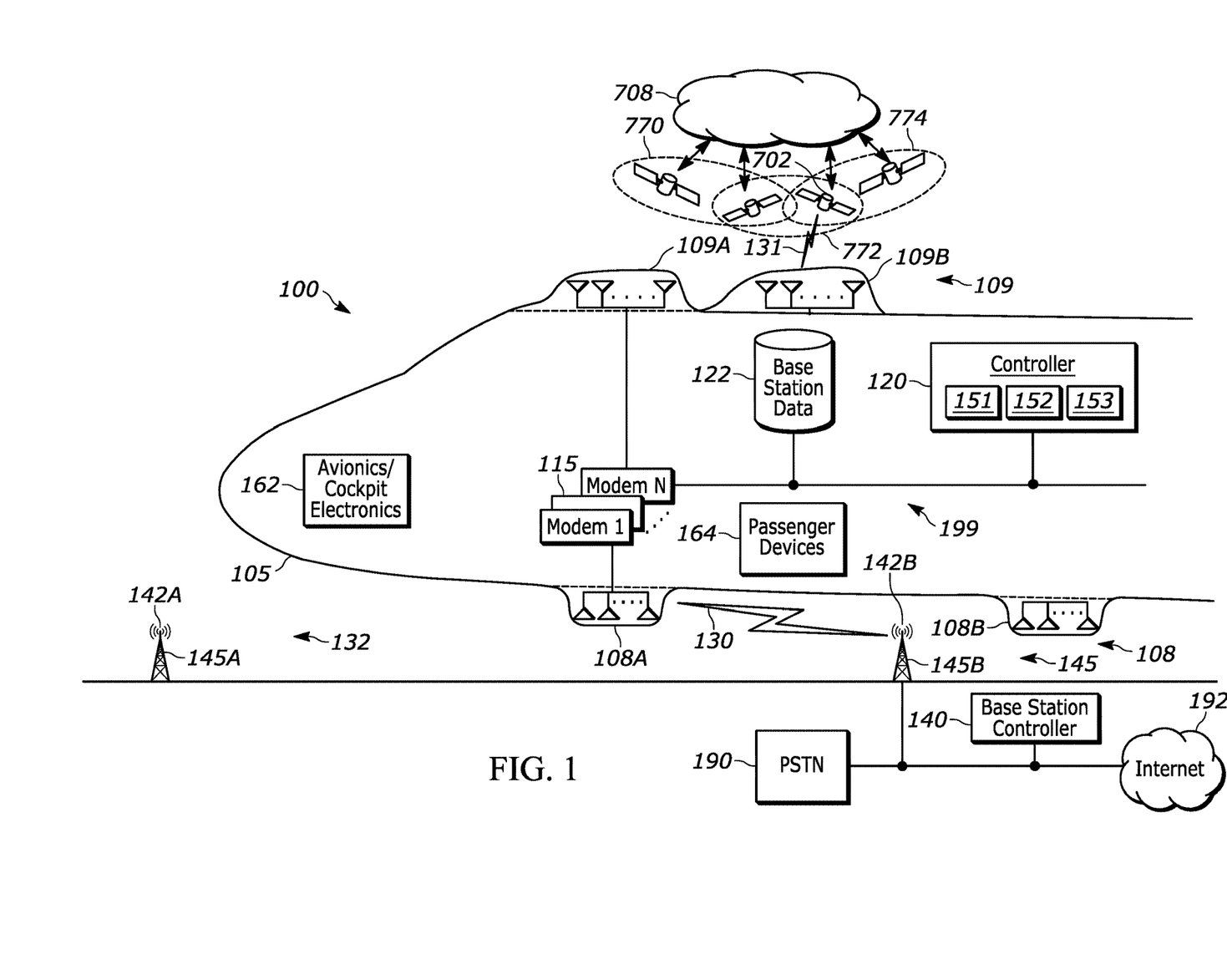
FIG. 1 is a block diagram of an example environment that includes an example communication system, for a vehicle, that is configured to implement the beam pointing techniques disclosed herein, according to an embodiment.

FIG. 1 depicts an example environment 100 that includes an example communication system capable, for a vehicle 105, that is configured to implement the beam pointing techniques disclosed herein (e.g., wherein fine tuning a beam may occur in the azimuth angle and/or the elevation angle). The vehicle 105 may include communication equipment, including one or more antennas. Each antenna may have or form, in part or in whole, one or more beamformers. Generally speaking, the term "beamformer" refers to any suitable technology configured to form one or more beams beam. A beamformer may be any suitable collection of circuitry (analog and/or digital), software, and/or antennas configured to implement a beam. A beamformer may be a transmit beamformer or a receive beamformer. A communication terminal may have two or more transceivers. In a typical example, one is used for connecting to a serving cell, and another one is used to perform measurements on candidate cells to enable handovers. Regarding beamforming, transceivers may perform beamforming functions (digital beamformer) or be associated with a dedicated beamformer (analog beamforming), if desired. In some instances, a first beamformer points to a serving cell, and a second beamformer is used to measure neighbor cells. In some instances, additional beamformers may be used to establish connectivity to other serving cells (e.g., enabling a dual connectivity feature) or to other frequencies.

Generally speaking, a beam is the realization of a given orientation. In an example, communication with a server station (e.g., on the ground or satellite) may be realized with at least two primary beamformers (one for tx another for rx), and one or more secondary beamformers for handover measurements or for fine tuning the orientation of the primary beamformers. A controller 120 for the communication system 199 of the vehicle 105 may identify a desired pointing angle (e.g., azimuth or elevation) for a first beam used by an antenna or antenna array on the vehicle for communication with external systems (e.g., the first beam being used for communication with a ground-based antenna or a satellite antenna) by implementing a second beam and by testing numerous pointing angles for the second beam. The controller 120 may test the numerous pointing angles by obtaining a signal measurement at each pointing angle (e.g., signal strength, SNR, etc.). The controller 120 may determine a given pointing angle with the best signal measurement, and may use the given pointing angle for the first beam. Advantageously, by using the second beam to identify the desired pointing angle, the first beam can remain in service to facilitate communication between the vehicle 105 and the external systems while the improved pointing angle is detected. Depending on the embodiment, the second beam may be implemented by the same antenna implementing the first beam, or by a different antenna.

Generally speaking, a "beam" is the radiation pattern for a given antenna, and may be used to refer to the main lobe of the radiation pattern. The half power beam width is the angle between the half-power (−3 dB) points of the main lobe, when referenced to the peak effective radiated power of the main lobe. Said another way, the half power beam width is the angle in which relative power is more than 50% of the peak power, in the effective radiated field of the antenna. If one were to draw a line from antenna projecting the beam through the center of the beam, this line would be considered the "pointing angle" of the beam (e.g., relative to the front of the vehicle 105 or to the head of the vehicle 105). Generally speaking, this line is also the "maximum direction" of the radiation pattern (i.e., the direction in which the beam extends furthest). Accordingly, by adjust the pointing angle of the beam, one can adjust the "maximum direction" of the beam, thereby focusing and directing the beam to a desired target, for example. Generally speaking, the pointing angle may be locally referenced to the geographic coordinate system of the antenna. If desired, the pointing angle may be referenced to the geographic coordinate system of the source or receiver of the communication link. Conversion to a respective geographic coordinate system may be accomplished through a coordinate transformation. The pointing angle may be referenced to an azimuth angle (e.g., from True North in the Earth-Center Earth-Fixed coordinate system), as well as an elevation angle (e.g., relative a horizontal or vertical plane of the antenna's or vehicle's geographic coordinate system).

The environment 100 may include the vehicle 105, which may be (i) in communication with a base station 145 via a communication link 130 and/or (ii) in communication with a satellite network 708 via a communication link 131.

Although the vehicle 105 is depicted as an airplane, the vehicle 105 may be any suitable vehicle, such as an automobile (e.g., bus, a car, a truck, etc.), a rail-based vehicle (e.g., a typical train, a subway, a monorail, etc.), any suitable aircraft (e.g., an airplane, a helicopter, a gyrocopter, an airship or blimp, a balloon, etc.), a watercraft (e.g., a ship, a speedboat, etc.), or a hybrid vehicle (e.g., a flying car, a hovercraft, etc.), etc. Further, although FIG. 1 illustrates a single vehicle 105, in some embodiments, the environment 100 may include any number of vehicles configured to perform the antenna control techniques described herein.

As illustrated, the vehicle 105 is equipped with the controller 120 that supports communications external to the vehicle 105 via the communication link 130 and/or via the link 131. The controller 120 may be any suitable computing device, and may be a node of an in-vehicle communication network or system 199, which may include any desired number of nodes, networks/subnetworks, and/or systems/ subsystems configured to connect to the system 199 via any suitable wired or wireless link.

Returning to FIG. 1, the controller 120 may include a processor 151; a memory 152 coupled to the processor 151 (e.g., via a bus—not shown), where the memory 152 stores machine-readable instructions executable on the processor 151; and a communication interface 153 coupled to the processor 151 (e.g., via the bus).

The processor 151 and controller 120 may be configured to implement the beam pointing and antenna control functions discussed herein (e.g., by executing instructions, stored to the memory 152, representing the logic for such control functions). In some embodiments, the controller 120 may include one more permanently or semi-permanently configured circuits for performing the described functions (e.g., ASICs).

The in-vehicle network or system 199 and its various nodes may be linked to external nodes or networks via a first set of antennas 109 configured for satellite communication and/or via a second set of antennas 108 configured for ground-based communication. The set of antennas 108 may include an antenna or antenna array 108A and an antenna or antenna array 108B. The set of antennas 109 may include an antenna or antenna array 109A and an antenna or antenna array 109B.

To facilitate communication between nodes within the network 199, the network 199 may include any desired networking equipment such as routers, hubs, switches, repeaters, bridges, access points, and/or gateway devices. Some of the networking equipment may utilize a spread spectrum paradigm and/or one or more RF bands (e.g., an ISM band, such as the 900 MHz band, 2.4 GHz band or 5 GHz band) to facilitate communication. The in-vehicle network 199 may include one or more personal area networks (PANs) and/or local area networks (LANs), any one of which may be wired and/or wireless in nature (e.g., a WiFi network).

In some instances, the in-vehicle network 199 includes an ARINC (Aeronautical Radio, Incorporated) network and/or Ethernet links and equipment for routing and delivering avionics data and other cockpit data. In some embodiments, an avionics node or network 162 may be coupled to the network 199. The avionics node 162 may include any suitable avionics or cockpit information, including data relating to the position, orientation, and/or movement of the vehicle (e.g., airspeed, ground speed, vertical speed, heading, attitude, pitch, roll, yaw, etc.). In an embodiment, one or more of the nodes 162 may establish communication with a node external to the vehicle 105 via the network 199, the antennas 108/109, and/or the links 130/131. This may enable the nodes 162, for example, to receive relevant data while in flight, such as up-to-date weather information, up-to-date NOTAMs, up-to-date TFRs, up-to-date traffic information about other vehicles in the area, etc.

If desired, one or more passenger devices 164 may be coupled to the network 199 (e.g., via a subnetwork and access point, neither of which is shown). The devices 164 may be any suitable personal computing devices, such as mobile phones, tablets, laptops, etc. Each device 164 may include a processor, memory, network interface, etc. One or more of the devices 164 may be coupled to an on-board content delivery system (not shown) that delivers to the devices 164 media that is stored locally to a memory of the vehicle 105 (e.g., movies, games, audio content, etc.). In an embodiment, one or more of the devices 164 may establish communication with a node external to the vehicle 105 via the network 199, the antennas 108/109, and/or the links 130/131. By establishing connection to outside nodes and networks, the devices 164 may access (e.g., while in flight) the internet and services, sites, and content provided via the internet (e.g., websites, email, social media, etc.).

The controller 120 is coupled to a base station database 122 configured to store information about the base stations 145 (as well as any other base station included in the communication network). The base stations 145 include a base station 145A and a base station 145B. In an example, the base station database 122 includes a data table that associates a base station identifier with a geographic position of the corresponding base station. To this end, communications received from the base station 145A may be configured to include the base station identifier corresponding to the base station 145A. Similarly, communications received from the base station 145B may be configured to include a base station identifier corresponding to the base station 145B.

In some embodiments, one or more of the antennas 108 are or include a phased antenna array configured to produce a beamform directed at one of the base stations 145. For example, the controller 120 may determine a relative position of the base station 145B (i.e., relative to the vehicle 105) based on data in the database 122 and based on a detected or determined position of the vehicle 105. Based on the relative position, the antenna 108A, for example, may be configured (e.g., by the controller 120) to produce a beamform (e.g., having significant gain) directed at the location of the base station 145B.

If desired, the controller 120 may calculate (e.g., regularly while the vehicle 105 is moving) a best base station for establishing ground-based communication. For example, based on data in the database 122 and based on a known or estimated position of the vehicle 105, the controller 120 may determine that the base station 145A is the "best" base station. Then, based on the known or estimated position of the based station 145A and the known or estimated position of the vehicle 105, the controller 120 may form or manipulate a first beam, via the antenna 108A, to have a particular pointing angle directed to the base station 145A (e.g., representing a "guessed" best angle). This first beam may be a widebeam, which may not provide as much bandwidth or data transmission as a narrowbeam, but which allows for a wider range of areas in which the base station 145A may be located while still allowing for communication (e.g., it might be said that the widebeam improves the chance that the controller 120 and antenna 108A will discover the base station 145A). The controller 120 may implement this first beam to communicate with the base station 145A. The controller 120 may simultaneously, or near-simultaneously, position a second beam (e.g., from the antenna 108B) at numerous pointing angles within a given range of the pointing angle of the first beam to identify a desirable pointing angle according to a given signal measurement. The second beam may be a narrowbeam, which can offer improved throughput relative to a widebeam if properly aimed. By utilizing the second beam to cycle through and evaluate multiple point angles, the controller 120 can discover a pointing angle better than the original pointing angle (e.g., while using the first beam for communication, even if the first beam is less than ideal).

After identifying, via the second beam, the pointing angle with the best or most desirable signal measurement, the controller 120 may "fine tune" the antenna 108A and/or first beam by changing the pointing angle of the first beam to the pointing angle that was discovered to have the most desirable signal parameter value. If desired, the second beam may be formed and implemented via the same antenna 108A that is implementing the first beam. In various embodiments, the second beam is formed and implemented via a second antenna or antenna array (e.g., the antenna 108B). In various embodiments, the controller 120 may utilize a similar technique (i.e., using two beams) to fine tune a pointing angle used to communicate via satellites (e.g., via the vehicle antennas 109).

In any event, the controller 120 may be operatively connected to one or more modems 115 configured to support communications via the antennas 108 and 109. For example, the modems 115 may be configured to support respective communication protocols (e.g., TDMA, GSM, CDMA, GSM, LTE, WiMAX, NR, Wi-Fi, DVB, etc.) at respective frequency bands (e.g., $K_a$ band, $K_u$ band, L band, S band, Cellular band, AWS Band, PCS band, an unlicensed band, etc.). In the illustrated embodiment, the antennas or transceivers 109 may be adapted for communication via one or more satellite communication links 131 (e.g., using a modem 115 that supports satellite communication frequency bands) and the antennas or transceivers 108 may be adapted for communication with the base stations 145 via the communication link 130.

The base stations 145A and 145B include antennas 142A and 142B, respectively, which are configured to establish communication with nodes of the in-vehicle network 199 via links such as the link 131. In the shown example, the base station 145B includes a base station controller 140 configured to control operation of the antenna 142B. The base station 145A may include a similar controller. As illustrated, the base station 145B is connected to a public switched telephone system (PSTN) 190 and the internet 192 (which may include voice over internet protocol (VOIP) networks). Accordingly, any data the base station 145B receives from the vehicle 105 can be routed to an indicated destination external to the communication network. Additionally, the base station 145B may be configured to receive communications from the internet 192 and/or the PSTN 190 for forward link communication to the vehicle 105 via the communication link 130. The base station 145A may be configured to a similar manner as the base station 145B, and may be similarly connect to the PTSN 190 and to the internet 192 if desired.

As shown, the in-vehicle network 199 may be coupled, via the link 131, to one or more satellites, such as a satellite 702, in one or more signal environments 770,772,774. The satellite station 702 may be part of or associated with a communication network(s) 708 or constellations of communication satellite stations moving about the earth at various altitudes and speeds. Each communication satellite station may include a deterministic path or orbit, for example, high earth orbit (HEO), geostationary earth orbit (GEO), medium earth orbit (MEO), and low earth orbit (LEO). The satellite station 702 is capable of relaying information between the network 199 of the vehicle 105 and the communication network 708. The network 708 may be any suitable network that may enable communication with any desired nodes. For example, the network 708 may be linked to the internet 192, the ground stations 145, etc. In short, communication among any of the components of the communication network 708 may or may not include a proprietary network, a satellite sub-network, a secure public internet, a virtual private network, a ground network/sub-network, a ground-based wireless network, or some other type of network, such as dedicated access lines, plain ordinary telephone lines, satellite links, and combinations of these, etc. Where the communication network 708 includes or is otherwise connected to the internet 192, data communications may take place over the network 708 via an internet communication protocol.

Figure 2:
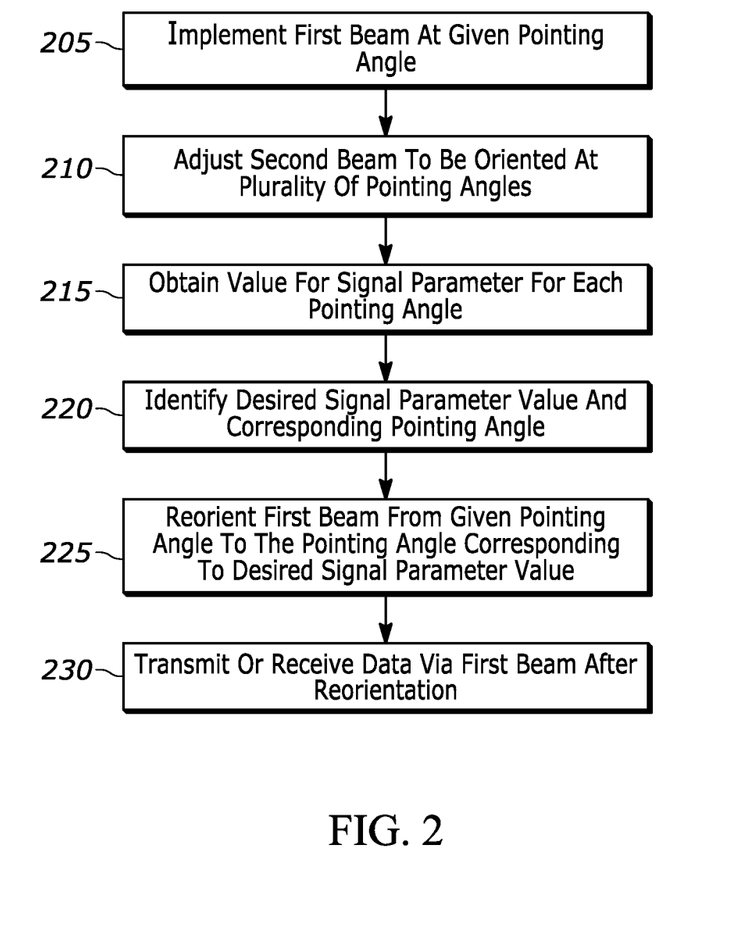
FIG. 2 is a flow diagram of an example method for detecting and utilizing a desired pointing angle for a beam, according to an embodiment.

FIG. 2 is a flow diagram of an example method 200 for detecting and utilizing a desired pointing angle for a beam. The method 200 may be implemented, in whole or in part, by the systems 100 shown in FIG. 1. Accordingly, the method 200 may be saved to a memory as one or more instructions or routines (e.g., the memory 152 shown in FIG. 1). For ease of explanation, the description of FIG. 2 refers to the system 100 as implementing the methods 200. At a high level, the method 200 involves forming or implementing a first beam for current or future communication purposes and using a second beam to potentially find a better pointing angle for the first beam, thereby "fine tuning" the pointing angle for first beam. Depending on the embodiment, the first and second beam may be implemented by the same antenna 108/109, or by two different antennas.

The controller 120 may implement the first beam (e.g., from the set of antennas 108) at a given pointing angle (for example, 60 degrees left of the vehicle's heading) (block 205). The given or original pointing angle may be calculated or selected as a "best guess" as to a "best" pointing angle for a beam to be used for communicating with a given external antenna (e.g., at a ground-based base station or at a satellite). The given or original pointing angle for the first beam may be calculated by the controller 120 based on: (i) a known position (e.g., X, Y, and Z coordinates) of an external antenna with which it intends to communicate via the first beam (e.g., the antenna 142A of the base station 145A); and (ii) a known or estimated position of the vehicle 105 (e.g., X, Y, and Z coordinates). The estimated position of the vehicle 105 may be calculated based on data from avionics in the vehicle 105 (e.g., from any desired combination of an EFIS or electronic flight instrument system, a heading indicator, a navigation unit, an altimeter, etc.). The position of the external antenna may be determined based on data stored at the database 122. Note, due to the speed of the vehicle 105, the position of the vehicle 105 may be rapidly changing at any given time. Thus, the controller 120 may estimate a future position of the vehicle 105 (e.g., based on a previously estimated or detected current position and based on a rate of travel) and may estimate a "best guess" pointing angle for the first beam at the future position. The controller 120 may then implement the first beam at the "best guess" pointing angle when it gets within a certain range of the future position (e.g., within 1, 2, 5, 10, or 20 miles).

In an embodiment, the first beam is an "active" beam when the original pointing angle is used. That is, the controller 120 and/or other nodes of the system 199 may be in communication with an external network (e.g., a ground-based network) via the first beam before any "fine tuning" has occurred. In an embodiment, the first beam is implemented while another beam (e.g., a third beam) is active. To this end, the method 200 may be implemented to "fine tune" the first beam before a handoff procedure during which communications are transitioned from the third beam to the first beam (e.g., after discovering an optimal or desirable pointing angle for the first beam). In some instances, handoff between the third beam and the first beam may occur before the first beam is fully fine tuned (e.g., when the third beam has significantly degraded).

In any event, the controller 120 may form or otherwise adjust the second beam to be oriented at a plurality of pointing angles (block 210). That is, the second beam may "sweep" through a plurality of pointing angles. In one example, the second beam begins the sweep at a certain offset from the pointing angle of the first beam (e.g., 10 degrees clockwise from the pointing angle of the first beam) and finishes the sweep at the opposite offset (e.g., 10 degrees clockwise from the point angle of the first beam). In various embodiments, a first beamformer is used for the "active beam" and one or more "other" beamformers (e.g., for a second or more beams) are used for handover measurements. These other beamformers may be time multiplexed between uses for handover measurements and fine-tuning the direction of the first beam.

At each of the pointing angles for the second beam, the controller 120 may obtain a set of signal data for a signal transmitted via the second beam (e.g., the set of signal data being data representing the detected signal), and may measure or detect, from the set of signal data, a value for a signal parameter (block 215) for each of the plurality of pointing angles. Said another way, for each pointing angle of interest, the controller 120 may obtain a set of signal data and may determine a signal parameter value of interest from the set of signal data.

Example signal parameters include a signal strength parameter, a signal-to-noise ratio (SNR), a signal-to-interference-plus-noise ratio (SINR), a reference signal received power (RSRP), or a reference signal received quality (RSRQ). Each value may be detected from a set of signal data.

The exact signal parameter or set of signal parameters used may depend on the implementation, and may depend on a number of factors. For example, a first set of signal parameters may be used when the vehicle 105 is near or over an urban environment (e.g., SINR, which may be more appropriate for the case of 2.4 GHz unlicensed, where interference tends to correlate with population density) and a second set of signal parameters when the vehicle 105 is not over the urban environment (e.g., signal strength).

As another example, the signal parameter may differ depending on whether the first beam is a receive beam or a transmit beam. For example, signal strength may be more relevant or important for a transmit beam, but SNR or SINR may be more relevant or important for a receive beam.

In any event, the controller 120 may obtain the measurements at a defined interval (e.g., 2 degrees) as the second beam is sweeping, and may detect a value for the signal parameter at every interval until the sweep is finished. To illustrate, if the original pointing angle of the first beam is 60 degrees left of the vehicle's heading, the controller 120 may sweep the second beam at pointing angles of 70 degrees to 50 degrees, obtaining measurements every two degrees (e.g., at 70, 68, 66, . . . 52, 50). It will be appreciated that any desired size or range of sweep may be used (e.g., 1, 2, 4, 10, 15, 20, or 30 degree sweeps), and that any desired interval may be used for obtaining values for the one or more signal parameters of interest (e.g., 0.1, 0.2, 0.5, 1, 2, or 5 degree intervals). Depending on the configuration, the controller 120 may obtain values for a plurality of signal parameters at each interval. For example, the controller 120 may obtain at each interval any one or more of: signal strength, SNR, SINR, RSRP, RSRQ, or an index representing some combination thereof (e.g., with any desired weighting for each individual parameter).

The controller 120 may determine or identify a desired value (e.g., the highest or best value) from the plurality of values for the signal parameter, and may determine or identify the pointing angle that resulted in the desired signal measurement (block 220). For example, the controller 120 may determine that a pointing angle of 64 degrees resulted in the highest signal strength, and may therefore choose a pointing angle of 64 degrees. As noted, the desired pointing angle may be selected based on an index calculated at each pointing angle, wherein each index represents a "score" that accounts for multiple signal parameters. Such an index may be calculated based on whether each signal parameter is graded as "excellent," "good," "fair," or "poor," for example. To illustrate, for signal strength or RSSI (received signal strength indicator), a "good" value may be between −65 and −75 dB, and an "excellent" value may be greater than −65 dB. For RSRP, a "good" value may be between −80 and −90 dB, and an "excellent" value may be greater than −80 dB. For RSRQ, a "good" value may be between −10 and −15 dB, and an "excellent" value may be greater than −10 dB. For SINR and/or SNR, a "good" value may be between 13 and 20 dB, and an "excellent" value may be greater than 20 dB. Note, any number of range and range values may be used. Those ranges and ranges values described above are merely illustrative.

The controller 120 may reorient the first beam from the given pointing angle to the pointing angle that resulted in the desired signal measurement for the second beam (block 225). This may involve physically reorienting an antenna. In some instances, the pointing angle of the first beam is changed without physically reorienting the antenna.

The controller 120 may transmit or receive data via the first beam after reorientation (block 230).

In some embodiments, the first beam is formed or otherwise implemented at the given pointing angle while another beam is "active." For example, during a handoff process, nodes of the system 199 may communicate with external networks via an "active" third beam establishing connect between the antenna 108B and the ground station 145B. Simultaneously, the first beam implemented by the antenna 108A may enable an initial connection between the system 199 and the ground station 145A, and the second beam (e.g., from the antenna 108A/B) may be used to identify a desirable pointing angle for the first beam. After the first beam is configured for the desirable pointing angle, the controller 120 may "handoff" or transition communication from the third beam (and ground station 145B) to the first beam (and ground station 145A).

Figure 3:
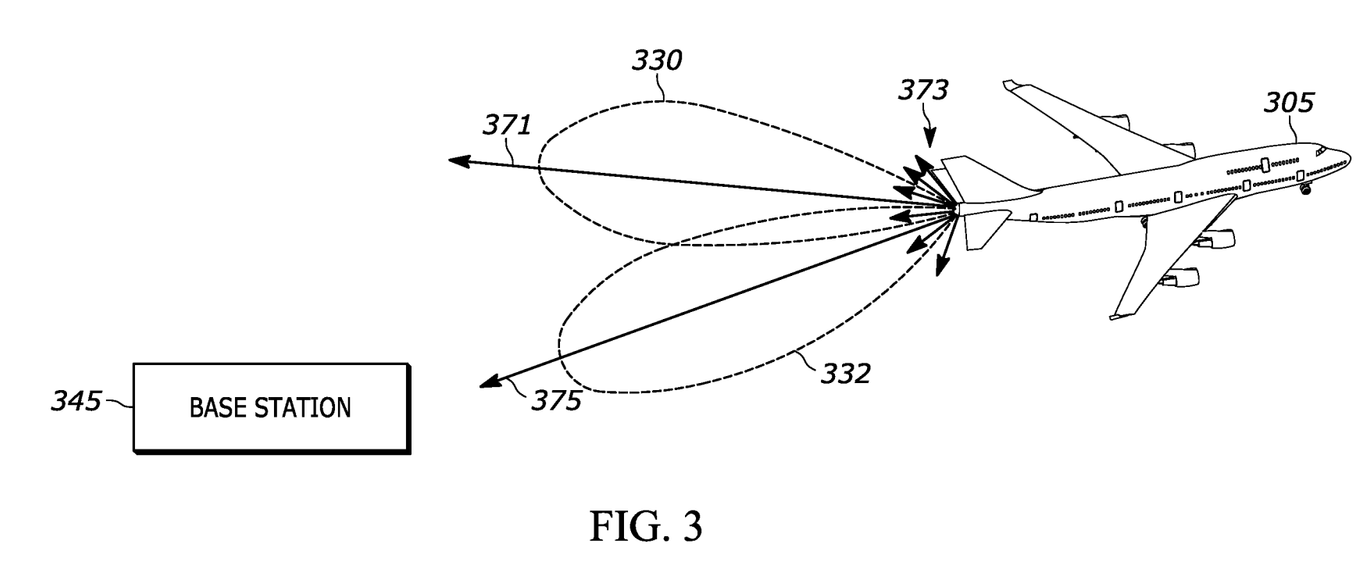
FIG. 3 depicts is an example system in which a vehicle implements the beam pointing techniques discussed herein.

FIG. 3 depicts is an example system 300 in which a vehicle 305 implements the beam pointing techniques discussed herein. The vehicle 305 and the base station 345 represent embodiments of the vehicle 105 and the base stations 145 shown in FIG. 1, respectively, and thus may perform the same or similar functions as those described with reference to the vehicle 105 and base stations 145, respectively.

As shown, the vehicle 305 implements a first beam 330 with a pointing angle 371 for the purpose of communicating with the base station 345. The vehicle 305 then implements a second beam 332 and sweeps the second beam through a plurality of angles 373 (including an angle 375), obtaining a value for a signal parameter (e.g., signal strength, SNR) at each of the angles 373. The vehicle 305 determines that the angle 375 has the best value for the signal parameter, and then reorients the beam 330 to have the pointing angle 375.

Figure 4:
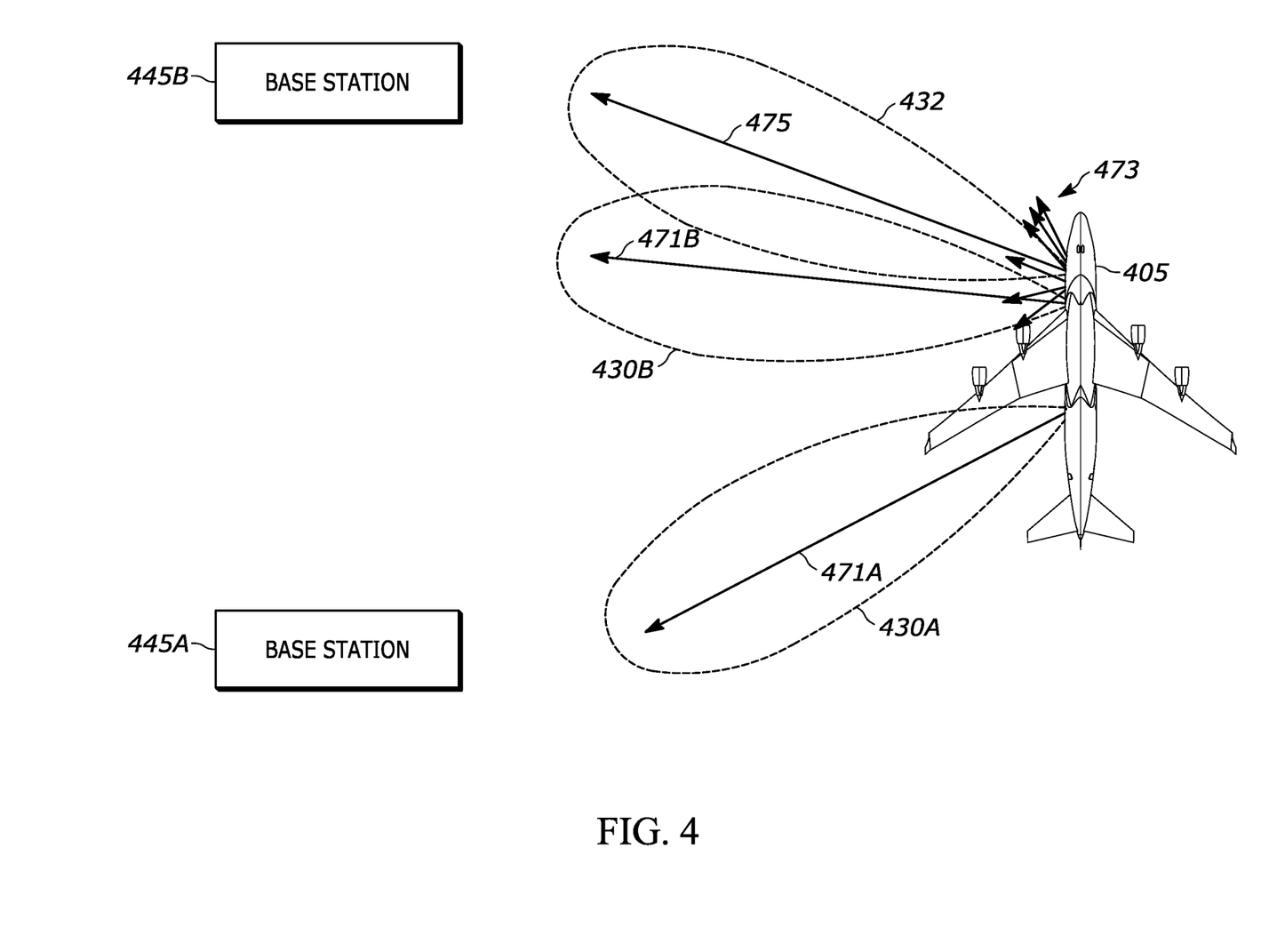
FIG. 4 depicts is an example system in which a vehicle implements the beam pointing techniques discussed herein during a communication handoff from a first base station to a second base station.

FIG. 4 depicts is an example system 400 in which a vehicle 405 implements the beam pointing techniques discussed herein during a communication handoff from a base station 445A to a base station 445B. The vehicle 305 and the base station 345 represent embodiments of the vehicle 105 and the base stations 145 shown in FIG. 1, respectively, and thus may perform the same or similar functions as those described with reference to the vehicle 105 and base stations 145, respectively.

As shown, the vehicle 405 implements a first beam 430B, a second beam 432, and a third beam 430A. During example operation, the vehicle 405 may implement the third beam 430A at a pointing angle 471A to communicate with the base station 445A. The third beam may be the "active" beam that establishes communication between the vehicle 405 and an external network such as the internet, wherein the vehicle 405 uses the third beam 430A to communicate with the external network via base station 445A.

The vehicle 405 may initiate a transfer or handoff process to establish communication with the external network via the base station 445B instead of the base station 445A. The handoff process may begin in response to detecting that an existing beam or link has deteriorated past (e.g., based on an analysis of signal strength, SNR, SINR, etc.).

To begin the handoff, the vehicle 405 may implement the first beam 430B at a pointing angle 471B. The first beam 430B may initially be "inactive"—that is, it is not being used to establish communication to a ground-based network. Then, the vehicle 405 implements the second beam 432 and sweeps the second beam 432 through a plurality of angles 473 (including an angle 475), obtaining a value for a signal parameter (e.g., signal strength, SNR) at each of the angles 473. The vehicle 405 determines that the angle 475 has the best value for the signal parameter, and then reorients the beam 430B to have the pointing angle 475. After reorienting the beam 430B, the vehicle 405 may "handoff" communication from the beam 430A to the beam 430B to thereby establish communication with a ground-based network (e.g., the internet) via the base station 445B instead of the base station 445A.

Additional Considerations

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Generally speaking, the terms "processor" refers to a computer processor configured to fetch and execute instructions stored to memory. By executing these instructions, the disclosed processor(s) can carry out various operations or functions defined by the instructions. The disclosed processor(s) may be temporarily configured (e.g., by instructions or software) or permanently configured to perform the relevant operations or functions (e.g., a processor for an Application Specific Integrated Circuit, or ASIC), depending on the particular embodiment. Each disclosed processor may be part of a chipset, which may also include, for example, a memory controller or an I/O controller.

Generally speaking, as used herein the phrase "memory" or "memory device" refers to a system or device including computer-readable media or medium ("CRM"). "CRM" refers to a medium or media accessible by the relevant computing system for placing, keeping, or retrieving information (e.g., data, computer-readable instructions, program modules, applications, routines, etc). Note, "CRM" refers to media that is non-transitory in nature, and does not refer to disembodied transitory signals, such as radio waves. The CRM may be implemented in any technology, device, or group of devices included in the relevant computing system or in communication with the relevant computing system. The CRM may include volatile or nonvolatile media, and removable or non-removable media.

Generally speaking, the term "network" refers to a collection of nodes (e.g., devices or systems capable of sending, receiving or forwarding information) and links which are connected to enable telecommunication between the nodes. Depending on the embodiment (and unless otherwise stated), each of the described networks may include dedicated routers, switches, or hubs responsible for forwarding directing traffic between nodes, and, optionally, dedicated devices responsible for configuring and managing the network. Some or all of the nodes in the described networks may be also adapted to function as routers in order to direct traffic sent between other network devices. Nodes of the described networks may be inter-connected in a wired or wireless manner, and may have different routing and transfer capabilities.

Regarding the term "node," this generally refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Regarding the term "link," this generally refers to a pathway or medium connecting two or more nodes. A link may be a physical link or a logical link. A physical link is the interface or medium(s) over which information is transferred, and may be wired or wireless in nature. Example physicals links include (i) wired links such as cables with a conductor for transmission of electrical energy or a fiber optic connections for transmission of light and (ii) wireless links such as wireless electromagnetic signals that carry information via changes made to one or more properties of electromagnetic waves. A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

The phrase "wherein the system includes at least one of X, Y, or Z" means the system includes an X, a Y, a Z, or some combination thereof. Similarly, the phrase "wherein the component is configured for X, Y, or Z" means that the component is configured for X, configured for Y, configured for Z, or configured for some combination of X, Y, and Z.

In addition, use of the "a" or "an" are employed to describe elements and components of the embodiments herein. This description, and the claims that follow, should be read to include one or at least one. The singular also includes the plural unless it is obvious that it is meant otherwise.

While the present invention has been described with reference to specific examples, which are intended to be illustrative only and not to be limiting of the invention, it will be apparent to those of ordinary skill in the art that changes, certain additions or deletions may be made to the disclosed embodiments without departing from the spirit and scope of the invention. Further, although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible.

What is claimed is:

1. A vehicle communication system comprising:
    one or more antennas that are disposed on the vehicle and that are configured to implement a plurality of beams, including: (i) a first beam configured to be oriented at a given pointing angle to establish a link with one or more external antennas that are external to and not disposed on the vehicle, wherein the one or more antennas are configured to transmit or receive, via the first beam, data between one or more internal nodes disposed on the vehicle and the one or more external antennas external to the vehicle; and (ii) a second beam distinct from the first beam; and
    a controller configured to be communicatively coupled to the one or more antennas, wherein the controller is configured to:
    (i) adjust the second beam during a period of time to be oriented at a plurality of pointing angles;
    (ii) detect a plurality of sets of signal data for a signal from a particular external antenna, wherein each set of signal data is detected at a different one of the plurality of pointing angles;
    (iii) obtain a plurality of values for a signal parameter for the signal, wherein each value is obtained from a different one of the plurality of sets of signal data and corresponds to a different one of the plurality of pointing angles;
    (iv) analyze the plurality of values for the signal parameter to identify (a) a desired value for the signal parameter and (b) a particular pointing angle at which the desired value for the signal parameter was obtained;
    (v) reorient the first beam from the given pointing angle to the particular pointing angle corresponding to the desired value for the signal parameter; and
    (vi) transmit or receive data, via the first beam while it is oriented at the particular pointing angle, between the particular external antenna and at least one of the one or more internal nodes.

2. The system of claim 1, wherein the signal parameter is a first parameter when the first beam is a transit beam and wherein the signal parameter is a second parameter, distinct from the first, when the first beam is a receive beam.

3. The system of claim 1, wherein the signal parameter is the same parameter regardless of whether the first beam is a transmit or receive beam.

4. The system of claim 1, wherein the plurality of antennas includes a first antenna implementing the first beam and a second antenna implementing the second beam.

5. The system of claim 1, wherein the one or more antennas includes a first antenna implementing both the first and second beams.

6. The system of claim 1, wherein the signal parameter is a first parameter when the plurality of pointing angles are within a first range; and wherein the signal parameter is a second parameter distinct from the first parameter when the plurality of pointing angles are within a second range distinct from the first range.

7. The system of claim 1, wherein the pointing angle is an elevation angle.

8. The system of claim 1, wherein the vehicle is an aircraft.

9. The system of claim 1, wherein the signal parameter is an index and wherein each of the plurality of values is calculated based on values of both a signal strength parameter and a signal-to-nose ratio (SNR) parameter.

10. The system of claim 1, wherein the signal parameter is a signal strength parameter.

11. The system of claim 1, wherein the signal parameter is a signal-to-noise ratio (SNR), a signal-to-interference-plus-noise ratio (SINR), a reference signal received power (RSRP), or a reference signal received quality (RSRQ).

12. The system of claim 1, wherein the one or more external antennas include a first external antenna and a second external antenna each enabling connection to a ground-based network, wherein the particular external antenna is the second external antenna;
    wherein prior to adjusting the second beam to be oriented at the plurality of pointing angles, the controller is further configured to communicate with the ground-based network via a third beam by which connection is established between the one or more antennas on the vehicle and the first external antenna; and
    wherein after reorienting the first beam to the particular pointing angle, the controller is further configured to stop communicating with the ground-based network via the third beam and to start communicating with the ground-based network via the first beam by way of transmitting or receiving the data, via the first beam, between the second external antenna and the last least one of the one or more internal nodes.

13. The method of claim 12, wherein adjusting the second beam during the period of time to be oriented at the plurality of pointing angles is part of a fine-tuning function, wherein the controller is further configured to use the second beam for handover measurements, wherein the controller is configured implement both the fine-tuning function and the handover measurements via the second beam using multiplexing techniques.

14. A method for fine tuning beam pointing angles, the method comprising:
    implementing, via a plurality of antennas disposed at a vehicle, a first beam at a given pointing angle to establish a link with one or more external antennas that are external to and not disposed on the vehicle, wherein the one or more antennas are configured to transmit or receive, via the first beam, data between one or more internal nodes disposed on the vehicle and the one or more external antennas external to the vehicle;
    implementing, via the one or more antennas, a second beam distinct from the first beam;
    adjusting the second beam during a period of time to be oriented at a plurality of pointing angles;

detecting a plurality of sets of signal data for a signal from a particular external antenna, wherein each set of signal data is detected at a different one of the plurality of pointing angles;

obtaining a plurality of signal measurements for the signal, wherein each signal measurement is obtained from a different one of the plurality of sets of signal data and corresponds to a different one of the plurality of pointing angles;

analyzing the plurality of signal measurements to identify (a) a desired signal measurement and (b) a particular pointing angle at which the desired signal measurement was obtained;

reorienting the first beam from the given pointing angle to the particular pointing angle corresponding to the desired signal measurement; and transmitting or receiving data, via the first beam oriented at the particular pointing angle, between the particular external antenna and at least one of the one or more internal nodes.

15. The method of claim 14, wherein the signal parameter is a first parameter when the first beam is a transit beam and wherein the signal parameter is a second parameter, distinct from the first, when the first beam is a receive beam.

16. The method of claim 14, wherein the signal parameter is the same parameter regardless of whether the first beam is a transmit or receive beam.

17. The method of claim 14, wherein the plurality of antennas includes a first antenna implementing the first beam and a second antenna implementing the second beam.

18. The method of claim 14, wherein the one or more antennas includes a first antenna implementing both the first and second beams.

19. The method of claim 14, wherein the signal parameter is a first parameter when the plurality of pointing angles are within a first range; and wherein the signal parameter is a second parameter distinct from the first parameter when the plurality of pointing angles are within a second range distinct from the first range.

20. The method of claim 14, wherein the pointing angle is an azimuth angle.

21. The method of claim 14, wherein the one or more external antennas include a first external antenna and a second external antenna each enabling connection to a ground-based network, wherein the particular external antenna is the second external antenna;

wherein the method further comprises:
prior to adjusting the second beam to be oriented at the plurality of pointing angles, communicating with the ground-based network via a third beam by which connection is established between the one or more antennas on the vehicle and the first external antenna; and after reorienting the first beam to the particular pointing angle, stop communicating with the ground-based network via the third beam and start communicating with the ground-based network via the first beam by way of transmitting or receiving the data, via the first beam, between the second external antenna and the last least one of the one or more internal nodes.

* * * * *

UNITED STATES PATENT AND TRADEMARK OFFICE
CERTIFICATE OF CORRECTION

| | | |
|---|---|---|
| PATENT NO. | : 11,616,565 B2 | Page 1 of 1 |
| APPLICATION NO. | : 17/364165 | |
| DATED | : March 28, 2023 | |
| INVENTOR(S) | : Heinz A. Miranda et al. | |

It is certified that error appears in the above-identified patent and that said Letters Patent is hereby corrected as shown below:

In the Claims

At Column 14, Line 45, "method" should be -- system --.

Signed and Sealed this
Eighteenth Day of June, 2024

*Katherine Kelly Vidal*
Katherine Kelly Vidal
*Director of the United States Patent and Trademark Office*